(12) United States Patent
Machani

(10) Patent No.: US 10,225,084 B1
(45) Date of Patent: Mar. 5, 2019

(54) METHOD, APPARATUS AND COMPUTER PROGRAM PRODUCT FOR SECURELY SHARING A CONTENT ITEM

(71) Applicant: EMC Corporation, Hopkinton, MA (US)

(72) Inventor: Salah E. Machani, Toronto (CA)

(73) Assignee: EMC IP Holding Company LLC, Hopkinton, MA (US)

( * ) Notice: Subject to any disclaimer, the term of this patent is extended or adjusted under 35 U.S.C. 154(b) by 177 days.

(21) Appl. No.: 14/982,798

(22) Filed: Dec. 29, 2015

(51) Int. Cl.
| H04L 29/06 | (2006.01) |
| H04L 9/32 | (2006.01) |
| G06F 21/60 | (2013.01) |
| H04L 9/08 | (2006.01) |

(52) U.S. Cl.
CPC .......... *H04L 9/3213* (2013.01); *G06F 21/606* (2013.01); *H04L 9/083* (2013.01); *H04L 63/0428* (2013.01); *H04L 63/06* (2013.01); *H04L 63/083* (2013.01)

(58) Field of Classification Search
CPC ... H04L 9/3213; H04L 9/083; H04L 63/0428; H04L 63/06; H04L 63/083; G06F 21/606
USPC .......................................................... 713/164
See application file for complete search history.

(56) References Cited

U.S. PATENT DOCUMENTS

| 8,453,218 | B2 * | 5/2013 | Lan | H04L 63/0407 726/4 |
| 9,167,050 | B2 * | 10/2015 | Durazzo | H04L 63/0281 |
| 9,235,834 | B2 * | 1/2016 | Bradley | G06Q 20/1235 |
| 9,246,678 | B2 * | 1/2016 | Nayshtut | H04L 9/0825 |
| 9,253,185 | B2 * | 2/2016 | Alaranta | H04L 63/062 |
| 2003/0097571 | A1 * | 5/2003 | Hamilton | G06Q 20/00 713/182 |
| 2003/0097573 | A1 * | 5/2003 | Wheeler | G06Q 20/4014 713/182 |
| 2004/0128499 | A1 * | 7/2004 | Peterka | H04L 63/062 713/155 |
| 2005/0060542 | A1 * | 3/2005 | Risan | G06F 21/10 713/165 |

(Continued)

OTHER PUBLICATIONS

Bicakci, K., et al, 'TwinCloud: Secure Cloud Sharing Without Explicit Key Management', Jul. 13, 2016, Univ. of Economics & Technology, entire document, https://arxiv.org/pdf/1606.04705.pdf.*

(Continued)

*Primary Examiner* — Luu T Pham
*Assistant Examiner* — Ronald Baum
(74) *Attorney, Agent, or Firm* — Krishnedu Gupta

(57) ABSTRACT

Disclosed are techniques for securely sharing a content item. The techniques comprise receiving an authorization grant. The techniques also comprise utilizing the authorization grant to obtain an access token. The access token includes credentials for enabling access to a content item. The techniques further include requesting one of an encryption or decryption key from a key management system. The one of the encryption or decryption key facilitates encryption or decryption operations in connection with the content item. The techniques still further comprising performing an encryption or decryption operation in connection with the content item. The one of the encryption or decryption operation is performed using the corresponding one of the encryption or decryption key.

3 Claims, 4 Drawing Sheets

(56) References Cited

U.S. PATENT DOCUMENTS

| | | | | |
|---|---|---|---|---|
| 2005/0204038 | A1* | 9/2005 | Medvinsky | G06F 21/10 709/225 |
| 2005/0246193 | A1* | 11/2005 | Roever | G06Q 30/06 705/35 |
| 2007/0179898 | A1* | 8/2007 | Medvinsky | H04L 63/0428 705/59 |
| 2008/0126798 | A1* | 5/2008 | Ginter | G06F 21/10 713/164 |
| 2009/0254392 | A1* | 10/2009 | Zander | G06F 21/6218 705/50 |
| 2010/0211782 | A1* | 8/2010 | Auradkar | H04L 9/083 713/168 |
| 2011/0296179 | A1* | 12/2011 | Templin | H04L 9/0869 713/168 |
| 2012/0311686 | A1* | 12/2012 | Medina | H04L 63/0807 726/7 |
| 2013/0208893 | A1* | 8/2013 | Shablygin | H04L 9/0822 380/277 |
| 2013/0318347 | A1* | 11/2013 | Moffat | H04L 63/08 713/168 |
| 2014/0019753 | A1* | 1/2014 | Lowry | H04L 63/062 713/155 |
| 2014/0108792 | A1* | 4/2014 | Borzycki | G06F 21/6218 713/165 |
| 2014/0164776 | A1* | 6/2014 | Hook | H04L 9/14 713/171 |
| 2014/0304836 | A1* | 10/2014 | Velamoor | G06F 21/6209 726/28 |
| 2014/0351586 | A1* | 11/2014 | Hook | H04L 9/14 713/164 |
| 2016/0277368 | A1* | 9/2016 | Narayanaswamy | G06F 21/6218 |
| 2017/0099136 | A1* | 4/2017 | Straub | H04L 9/0819 |

OTHER PUBLICATIONS

Ghosalkar, D., 'Implementation Idea for Secure Data Deduplication Using Hybrid Cloud Approach', IJCST—vol. 4 Iss. 1, Jan./Feb. 2016, entire document, http://www.ijcstjournal.org/volume-4/issue-1/IJCST-V4I1P24.pdf.*

* cited by examiner

METHOD, APPARATUS AND COMPUTER PROGRAM PRODUCT FOR SECURELY SHARING A CONTENT ITEM

TECHNICAL FIELD

The present invention relates generally to security. More specifically, the present invention relates to a method, apparatus and computer program product for securely sharing a content item.

BACKGROUND OF THE INVENTION

Traditionally, users have shared digital content (e.g., a document, a digital audio file, a digital video file, a digital image file, or other digital information) with each other by hand carrying or otherwise transporting portable physical media such as floppy disks between computers. In recent years, however, data networks that interconnect computers allow users to send digital content to each other over the networks without having to transport physical media. For example, one user can send a file to another user as an attachment to an e-mail message.

Today, in addition to traditional methods, users share digital content by making it available for download from servers. For example, a user may upload digital content to a server. Another user may download the digital content from the server. As will be known, providers of such services include the likes of Dropbox, Box, SkyDrive, Drive, etc.

Unfortunately, this new approach has some disadvantages. For example, one of the main concerns is the security of the content. Reports about online fraud are increasingly in the news. If the content is valuable, any breach of security could be costly for the user.

Given the unparalleled growth in fraudulent activity, there is therefore a need for solutions for sharing digital content between users while also ensuring the security of the content. The present invention fulfils this and other needs.

SUMMARY OF THE INVENTION

There is disclosed a computer-implemented method, comprising executing, on at least one processor, the steps of: receiving an authorization grant; utilizing the authorization grant to obtain an access token, wherein the access token includes credentials for enabling access to a content item; requesting one of a encryption or decryption key from a key management system, wherein the one of the encryption or decryption key facilitates encryption or decryption operations in connection with the content item; and performing an encryption or decryption operation in connection with the content item, wherein the one of the encryption or decryption operation is performed using the corresponding one of the encryption or decryption key.

There is also disclosed a computer program product having a non-transitory computer readable medium which stores a set of instructions, the set of instructions, when carried out by computerized circuitry, causing the computerized circuitry to: receive an authorization grant; utilize the authorization grant to obtain an access token, wherein the access token includes credentials for enabling access to a content item; request one of a encryption or decryption key from a key management system, wherein the one of the encryption or decryption key facilitates encryption or decryption operations in connection with the content item; and perform an encryption or decryption operation in connection with the content item, wherein the one of the encryption or decryption operation is performed using the corresponding one of the encryption or decryption key.

There is further disclosed a device, comprising: memory; and processing circuitry coupled to the memory, the memory storing program code which, when executed by the processing circuitry, cause the processing circuitry to: receive an authorization grant; utilize the authorization grant to obtain an access token, wherein the access token includes credentials for enabling access to a content item; request one of a encryption or decryption key from a key management system, wherein the one of the encryption or decryption key facilitates encryption or decryption operations in connection with the content item; and perform an encryption or decryption operation in connection with the content item, wherein the one of the encryption or decryption operation is performed using the corresponding one of the encryption or decryption key.

BRIEF DESCRIPTION OF THE DRAWINGS

The invention will be more clearly understood from the following description of preferred embodiments thereof, which are given by way of examples only, with reference to the accompanying drawings, in which.

DETAILED DESCRIPTION

Embodiments of the invention will now be described. It is understood that such embodiments are provided by way of example to illustrate various features and principles of the invention, and that the invention hereof is broader than the specific examples of embodiments disclosed herein.

Figure 1:
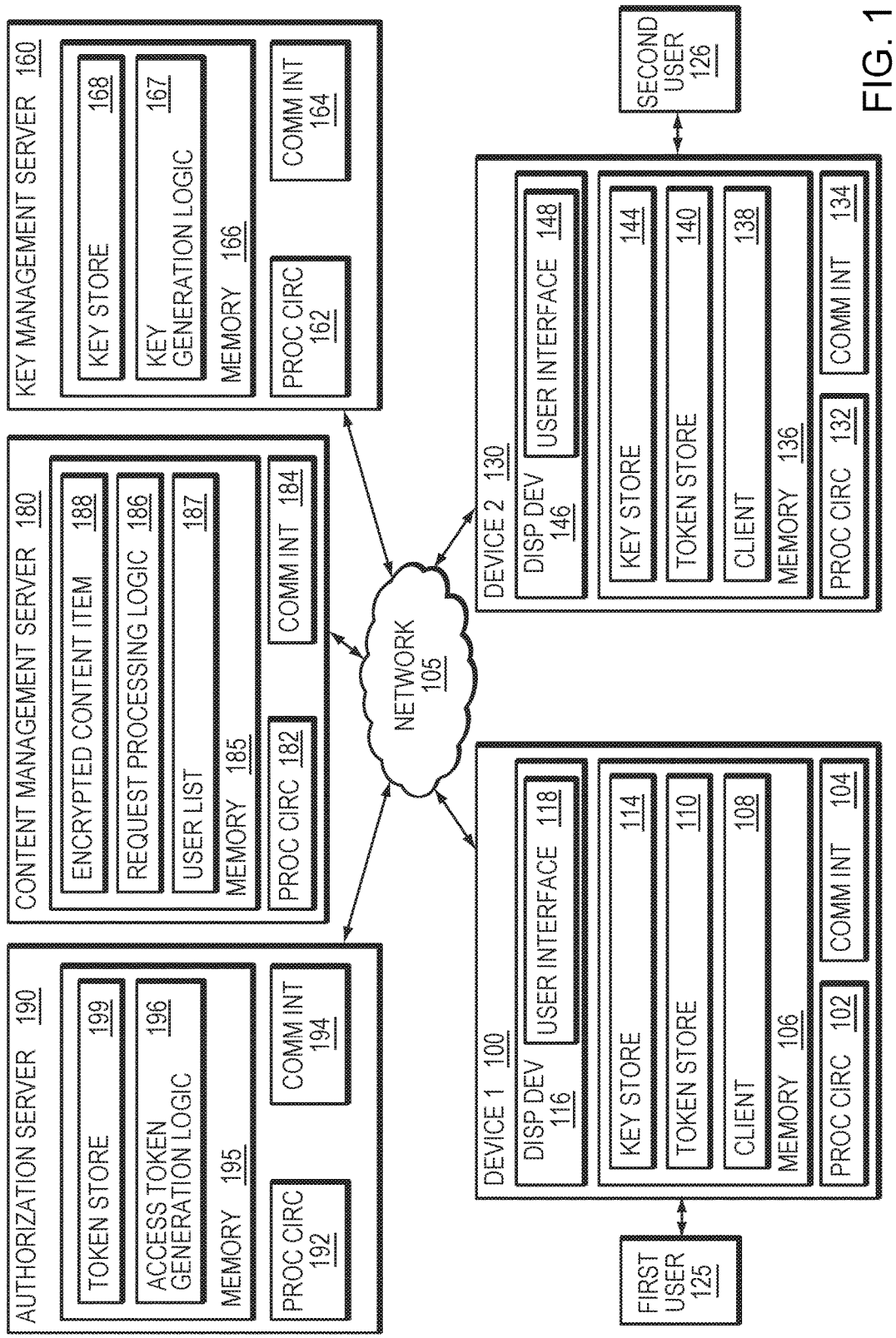
FIG. 1 is a block diagram showing an environment suitable for sharing content.

In the example of FIG. 1, a device 1 100, device 2 130, authorization server 190, key management server 160 and content management server 180 are communicably interconnected through a network 105. The network 105 may, for example, include one or more communication networks of any specific type, such as the Internet, a WAN (Wide Area Network), a LAN (Local Area Network), or any other type of communication network.

Each of device 1 100, device 2 130, authorization server 190, key management server 160 and content management server 180 include processing circuitry, communication interfaces, and memory. Specifically, device 1 100 includes processing circuitry 102, communication interfaces 104, and memory 106; device 2 130 includes processing circuitry 132, communication interfaces 134, and memory 136; authorization server 190 includes processing circuitry 192, communication interfaces 194, and memory 195; key management server 160 includes processing circuitry 162, communication interfaces 164, and memory 166; and content management server 180 includes processing circuitry 182, communication interfaces 184, and memory 185.

The communication interfaces in each of device 1 100, device 2 130, authorization server 190, key management server 160 and content management server 180 may, for example, include one or more adapters and/or network interface adapters for converting electronic and/or optical signals received over the network 105 into electronic form for use by the respective device or server.

The processing circuitry in each of device 1 100, device 2 130, authorization server 190, key management server 160 and content management server 180 may, for example, include or consist of one or more microprocessors, e.g. central processing units (CPUs), multi-core processors, chips, and/or assemblies.

The memory in each of device 1 100, device 2 130, authorization server 190, key management server 160 and content management server 180 may, for example, include or consist of any type of computer memory, such as volatile memory (e.g., RAM), or non-volatile memory (e.g. NVRAM), and/or semiconductor, magnetic or optical secondary computer storage (e.g. solid state, magnetic, or optical drives), and/or another computer readable medium, for storing program code executable on the respective processing circuitry, and for storing data operated on by such program code. For example, program code executable on device 1 100 is shown including client 108, program code executable on device 2 130 is shown including client 138, program code executable on authorization server 190 is shown including access token generation logic 196, program code executable on key management server 160 is shown including key generation logic 167 and program code executable on content management server 180 is shown including request processing logic 186.

Each of device 1 100, device 2 130, and authorization server 190 may also include a token store that may be used to store one or more access tokens. For example, device 1 100 may include token store 110, device 2 130 may include token store 140, and authorization server 190 may include token store 199.

Each of device 1 100, device 2 130, and key management server 160 may also include a key store that may be used to store one or more encryption keys generated by the key generation logic 167. For example, device 1 100 may include key store 114, device 2 130 may include key store 144, and key management server 160 may include key store 168.

Each of device 1 100 and device 2 130 may further include a display device (e.g. liquid crystal display, etc.) operable to display a graphical user interface through which respective first and second users 125 and 126 may enter (e.g. type or select using an input device such as a keyboard, and/or a computer mouse or other pointing device) a username, password, and/or passphrase or other data through one or more forms or other user interface constructs. For example, device 1 100 includes display device 116 operable to display user interface 118 and device 2 130 includes display device 146 operable to display user interface 148.

Content management server 180 may also comprise an encrypted content item 188. The content item is a logical collection of digital content. Digital content can include, but is not limited to, text, animations, audio, graphics, images, or some combination thereof. Content items can include, but are not limited to, files and folders. Files can include, but are not limited to, digital documents (e.g., .DOC, .PDF, .XLS, .TXT, and other document file types), digital audio files (e.g., .WAV, .M4A, .MP3, .AAC, and other digital audio file types), digital video files (e.g., .AVI, .MOV, .MP4, and other video file types) and digital image file (e.g., .JPEG, .TIFF, GIF, PNG, and other image file types). A folder is a named logical collection of one or more files and/or one or more folders.

Content management server 180 may further include a user list 187 used to store data describing one or more users that are trusted to access the content management server 180 and/or encrypted content item 188. For example, the user list 187 may include details of the first user 125 and the second user 126 trusted to access the encrypted content item 188.

For each of device 1 100, device 2 130, authorization server 190, key management server 160, and content management server 180, the processing units and the memory together form control circuitry, which is constructed and arranged to carry out various methods and functions as described herein. Each memory includes a variety of software constructs realized in the form of executable instructions. When the executable instructions are executed by the processing units, the processing units are caused to carry out the operations of the software constructs. Although certain software constructs are specifically shown and described, it is understood that the memory may include other software constructs, which are not shown, such as an operating system and various applications, and/or other processes or daemons.

It will be evident that device 1 100 and/or device 2 130 may be embodied using any specific type of computerized user device, including but not limited to desktop computers, and/or mobile devices such as laptop computers, tablet computers, smartphones, personal digital assistants (PDAs), and/or other types of user devices. It will also be evident that authorization server 190, key management server 160 and/or content management server 180 may be embodied using any specific type of server computer systems.

During operation, the device 1 100 obtains an authorization grant from the first user 125. In this particular embodiment, the first user 125 may be the person who creates or updates a content item and uploads it to the content management server 180 such that the content item can be shared with others users (e.g., the second user 126). Authorization grant may be a credential that represents the first user 125 authorization to access content in the content management server 180. For example, the authorization grant may be password credentials, such as a username and password, obtained from the first owner 125 through user interface 118.

Device 1 100 uses the authorization grant to obtain access token from authorization server 190. For example, client 108 authenticates to authorization server 190, and presents the authorization grant to access token generation logic 196. The access token generation logic 196 responds by validating the authorization grant and issuing the access token to the client 108. The access token in this embodiment represents an authorization that contains credentials, which are different from the authorization grant obtained from the first user 125, and which allows access to content in the content management server 180. For example, the access token may be a string denoting a specific scope of access permitted with regard to content in the content management system 180, a time duration (or "lifetime") for which the access token is valid, and/or other access attributes.

Also, it should be noted that upon validating the authorization grant, the access token generation logic 196 may also issue a refresh token to the client 108. The refresh token may contain credentials that may be used to obtain a new access token from authorization server 190 when the access token becomes invalid or expires. Unlike the access token, the refresh token may be used only with the authorization server 190, and is not sent to the content management server 180 and/or key management server 160.

Using the access token and/or the refresh token that are stored in the token store 110, the client 108 requests an encryption key from the key management server 160. The key management server 160 validates the access token, and in response to finding that access token is valid, utilizes the key generation logic 167 to generate an encryption key and return the encryption key to the device 1 100. It should be understood that in at least one embodiment the encryption key may be wrapped and protected using a user client public key of a public/private key pair provided to the key management server 160 by the device 1 100. As will be appreciated by those skilled in the art, each client application may be initialized with a public and private key pair, PK and pK. The client 108 of the device 1 100 sends the public key to the key management server 160 and it is then used to wrap the encryption key.

Device 1 100 receives the encrypted encryption key from the key management server 160. Once received, the device 1 100 decrypts the encryption key with the private key of the public-private key pair. The encryption key is then used to encrypt the content item. The encrypted content item 188 is then sent to the content management server 180 together with metadata describing the encryption key. It should be understood that the access token and a list of users trusted to access the content item may also be sent to the content management system 180. In this embodiment, the users include the second user 126. Once the content management server 180 validates the access token, the encrypted content item 188 and the associated metadata can be stored therein and a user list 187 created that includes the first user 125 and the second user 126.

Next, the second user 126, via the device 2 130, requests an access token from the authorization server 190 by presenting an authorization grant as described above. Upon authentication and validation of the authorization grant, the authorization server 190 proceeds to issue an access token to the device 2 130. The device 2 130 then submits the access token to the key management server 160 requesting the encryption key that was given to the first user. It should be understood that in this embodiment the encryption key may be a symmetric key that can also act as a decryption key depending on the circumstances. For example, the encryption key used to encrypt the content item for the first user 125 will be the decryption key with respect to decrypting the encrypted content item for the second user 126. The device 2 130 also submits a request to the content management server 180 for the encrypted content item 188 together with the access token. Once the access token is validated and the second user 126 confirmed as being on the user list 187 by the request processing logic 186, the encrypted content item 188 is delivered to the device 2 130. The device 2 130 is now in possession of the encrypted content item 188 and the decryption key enabling the second user 126 to have access to the content item.

Figure 2:
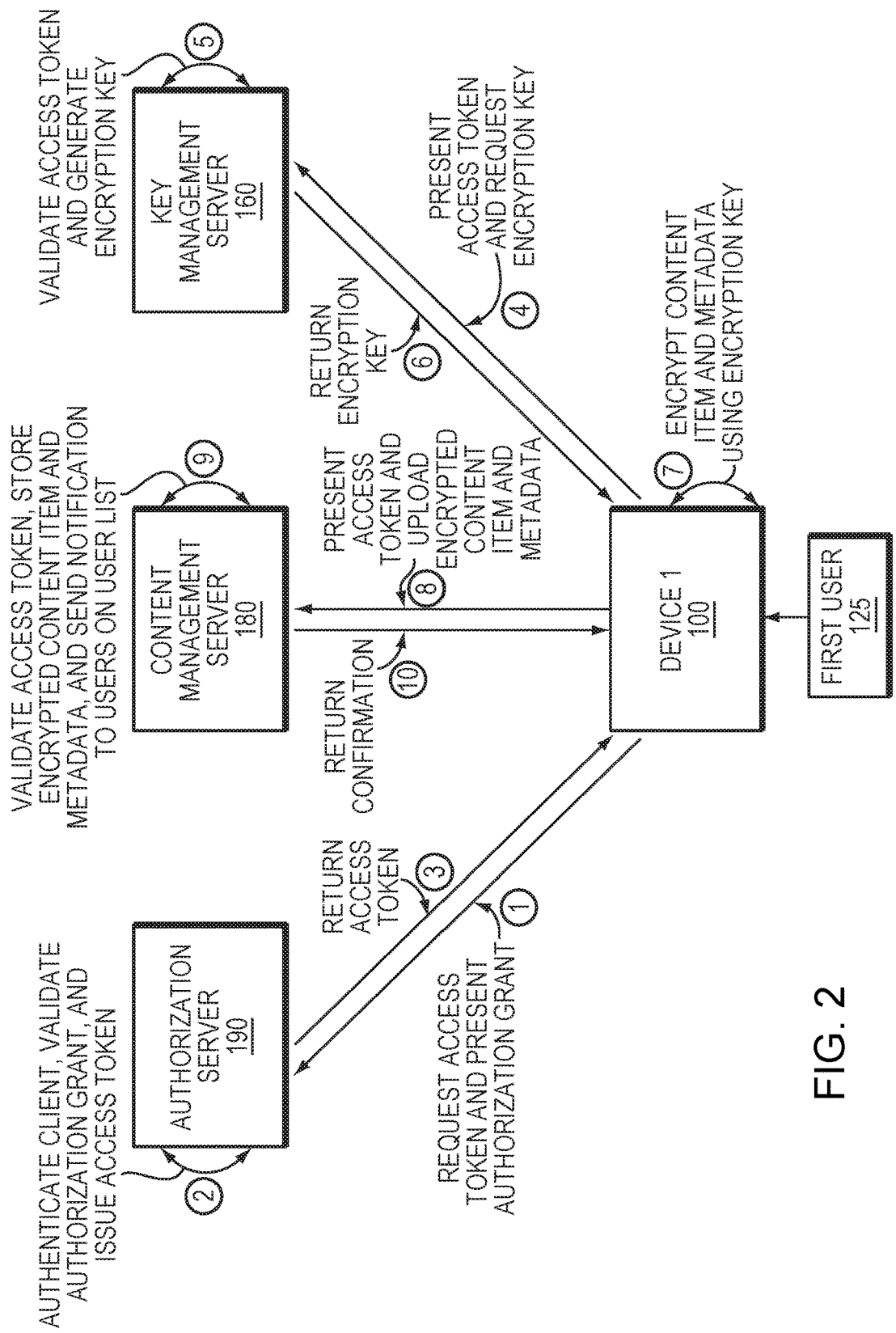
FIGS. 2 and 3 are block diagrams showing interaction between components of the environment of FIG. 1.

FIG. 2 is a block diagram showing interaction between components of the environment of FIG. 1. In this particular embodiment, the figure illustrates the interaction involved when a first user 125 wants to securely share a content item, such as a file, with a second user (not shown in FIG. 2). The steps as illustrated include a client application (not shown) of device 1 100 requesting an access token from authorization server 190. It should be noted as described earlier that such a request also includes presenting an authorization grant to the authorization server (step 1). In turn, the authorization server 190 authenticates client, validates authorization grant, and issues access token (step 2). Further, the authorization server 190 returns the access token to the device 1 100 (step 3). The client of the device 1 100 then presents the access token to key management server 160 and requests a new encryption key (e.g., file encryption key (FEK)) (step 4). The key management server 160 validates the access token and generates a random FEK (step 5). This step further involves wrapping key payload (FEK and FEK_ID) using a user's device public key of a public-private key pair. The key management server 160 returns the encrypted key payload to the device 1 100 (step 6). The client then decrypts the FEK using the private key of the public-private key pair. The client further uses FEK to encrypt a content item, in this particular embodiment a file, using the encryption key (step 7). The device 1 100 also presents access token and uploads encrypted content item and metadata to the content management server 180 (step 8). It should be understood that the encrypted file and metadata may be wrapped as a single file using a format that's consumable by other users (e.g., the FEK_ID could be part of the file name). The metadata includes the FEK_ID. The content management server then validates the access token, stores the encrypted content item upon validating the access token, and sends notification to other users in user list of trusted users (step 9). The content management server finally returns a confirmation to the device 1 100 (step 10).

Figure 3:
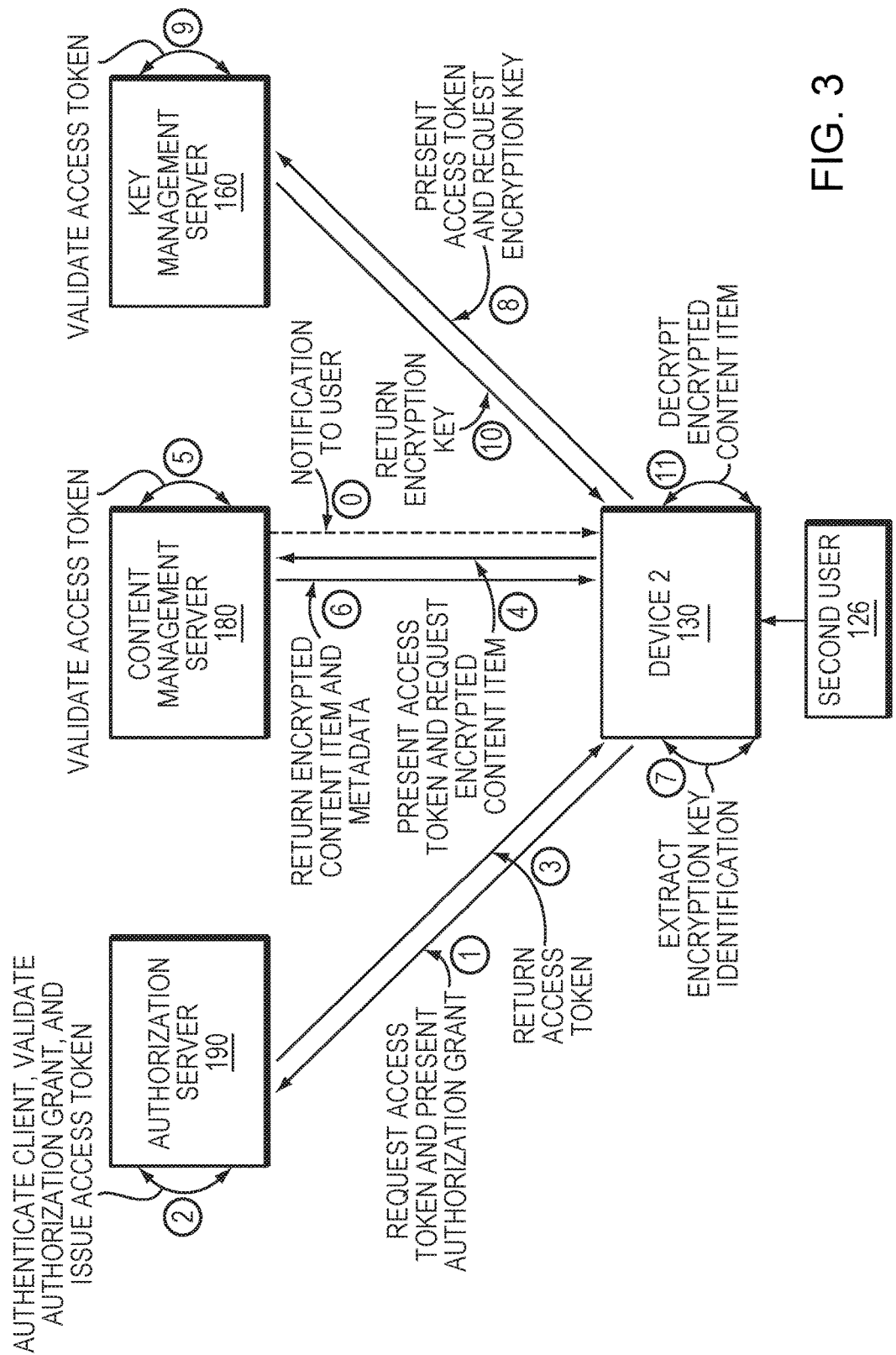

FIG. 3 is a block diagram showing interaction between components of the environment of FIG. 1. In this particular embodiment, the figure illustrates the interaction involved when a second user 126 wants to access a content item, such as a file, that has been uploaded to content management server 180 by the first user. The steps as illustrated include the client (not shown) of the device 2 130 receiving a notification from the content management server 180 (step 0). It should be noted from the previous FIG. 2 that step 9 in that particular figure forwarded a notification to all users on the user list. As the user list in this embodiment includes the second user 126, the notification is received at device 2 130. The client application requests an access token from authorization server 190 and presents the authorization grant to the authorization server 190 in a manner similar to that as described previously (step 1). Upon receiving the request, the authorization server 190 authenticates client, validates authorization grant, and issues access token (step 2). The authorization server 190 also returns the access token to the device 2 130 (step 3). The client application of device 2 then presents the access token to the content management server 180 and requests the encrypted content item and metadata (step 4). The content management server 180 validates the access token (step 5). Upon validating, the content management server 180 returns the encrypted content item and metadata (step 6). The client application then proceeds to extract FEK_ID (step 7). The client application then uses the access token to request the file encryption key FEK (i.e., the encryption key is the decryption key in this particular embodiment) from key management server 160 (step 8). The key management server 160 validates the access token (step 9). The key management server 160 then returns FEK wrapped using the device client public key of public-private key pair (step 10). Client application finally unwraps the FEK and uses FEK to decrypt the encrypted content item (step 11).

Figure 4:
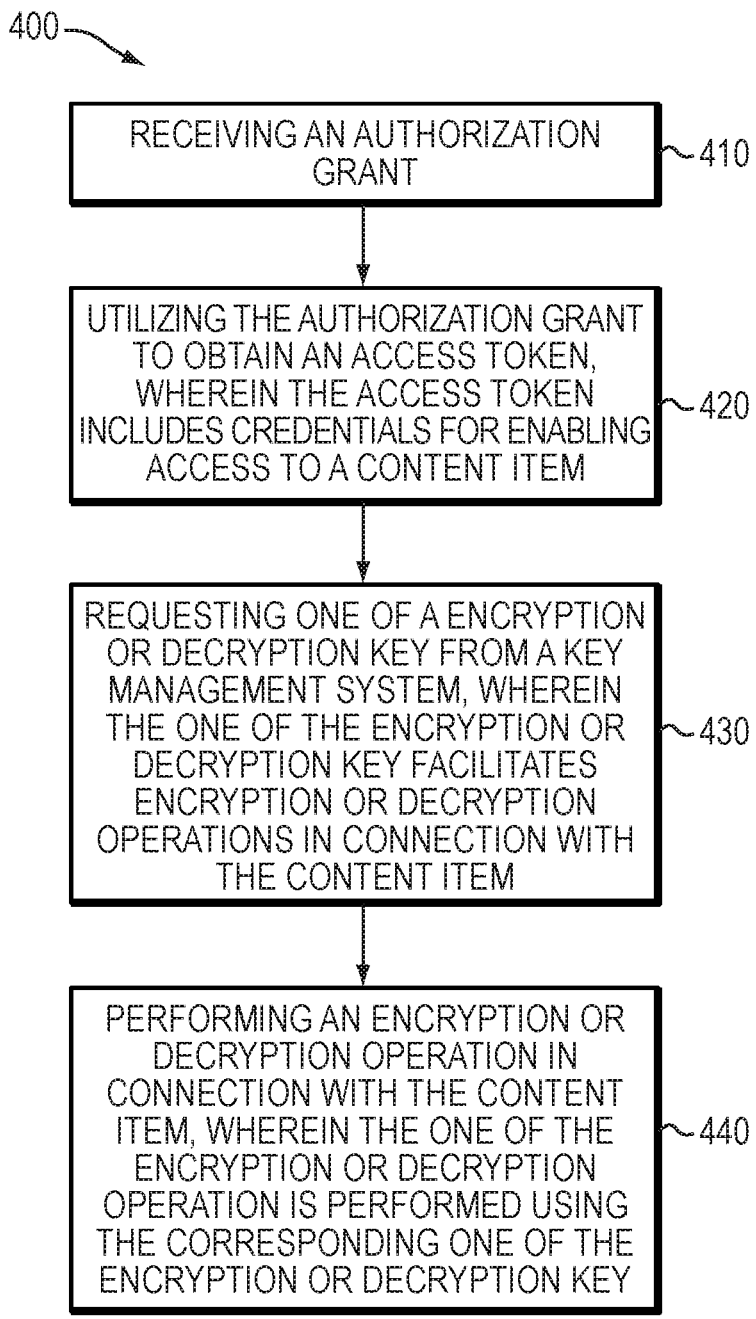
FIG. 4 is a flow chart showing method steps that can be performed in the environment of FIG. 1.

FIG. 4 is a flow chart showing an example of method steps 400 performed in an illustrative embodiment. At step 410, an authorization grant is received. At step 420, the authorization grant is utilized in order to obtain an access token that includes credentials for enabling access to a content item. At step 430, one of an encryption or decryption key is requested from a key management system. The one of the encryption or decryption key facilitates encryption or decryption operations in connection with the content item. At step 440, an encryption or decryption operation is performed in connection with the content item. The one of the encryption or decryption operation is performed using the corresponding one of the encryption or decryption key.

Advantageously, the above approach as described has several advantages over the prior art approach. Firstly, it does not require complex key management processes. It can also leverage standard provisioning workflows and does not require expensive provisioning processes. It also allows for sharing files with individual users or groups of users using the same scheme. It further supports on-model for key distribution which scales well when the number of users increases. It can further support offline access to files. Additionally, it can be implemented and integrated easily with existing cloud-based storage services and sync clients. Furthermore, it supports forward file protection. Moreover, it can leverage existing access control mechanisms in cloud-based file storage services for user authentication and authorization.

While the content management system is described in detail above, it should be understood that in particular embodiments the system may be a third party file storage and sharing service (FSS). Additionally, it should be understood that in particular embodiments the key management system (KMS) may be a multi-tenant or a private cloud-based service hosted by the organization. The authorization server function can be part of the FSS, KMS or a standalone. In all cases, the authorization server is trusted by all parties.

While the above description describes storing encrypted content item in the content management system, it should be understood that the client application may save the encrypted content item locally for offline access. For example, a document may be encrypted using the same FEK. The FEK can be stored locally in a protected key container.

While it is described above in relation to previous figures that the authorization server may issue access tokens, it should be understood that a first access token may be issued following successful user authentication and may allow the user to access a content item by either logging in to content management system account and uploading an encrypted content item or requesting and downloading an encrypted content item shared by other users. It should be further understood that a second access token may be issued to be used by the user to request an encryption key or decryption key from the key management server.

While it is described above in relation to previous figures that a single file is uploaded containing the encrypted content item and associated metadata, it should be understood that it may be possible to upload two separate files. For example, a first file may contain the encrypted content item. A second file may contain the encryption metadata. Further, the user may be issued a single access token to obtain both files from the content management system or two separate access tokens as described above.

While the key management server and the content management server are described above as validating the access tokens, it should be understood that the key management server and the content management server may or may not need to call back the authorization server to validate the access token. For example, the access tokens may be validated locally. If the access token is a digitally signed assertion, key management server and content management server may validate the token through verification of the signature over that token.

While the above description describes access tokens, entities and protocols described in OAuth 2.0, the disclosed system is not so limited. The disclosed system may alternatively be embodied in or using other authorization frameworks such as Security Assertion Markup Language (SAML), and authentication protocols such as Kerberos when authentication and authorization are delegated to a local agent on device.

Those skilled in the art will recognize that the disclosed techniques are significantly more than the abstract idea of accessing a resource, and that embodiments based on the disclosed techniques address technical problems arising from the approaches used in previous technologies. Embodiments of the disclosed techniques may, for example, advantageously allow a content item to be securely shared.

While the above description provides examples of embodiments using various specific terms to indicate specific systems, devices, and/or components, such terms are illustrative only, and are used only for purposes of convenience and concise explanation. The disclosed system is not limited to embodiments including or involving systems, devices and/or components identified by the terms used above.

As will be appreciated by one skilled in the art, aspects of the technologies disclosed herein may be embodied as a system, method or computer program product. Accordingly, each specific aspect of the present disclosure may be embodied using hardware, software (including firmware, resident software, micro-code, etc.) or a combination of software and hardware. Furthermore, aspects of the technologies disclosed herein may take the form of a computer program product embodied in one or more non-transitory computer readable storage medium(s) having computer readable program code stored thereon for causing a processor and/or computer system to carry out those aspects of the present disclosure.

Any combination of one or more computer readable storage medium(s) may be utilized. The computer readable storage medium may be, for example, but not limited to, a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any non-transitory tangible medium that can contain, or store a program for use by or in connection with an instruction execution system, apparatus, or device.

The figures include block diagram and flowchart illustrations of methods, apparatus(s) and computer program products according to one or more embodiments of the invention. It will be understood that each block in such figures, and combinations of these blocks, can be implemented by computer program instructions. These computer program instructions may be executed on processing circuitry to form specialized hardware. These computer program instructions may further be loaded onto a computer or other programmable data processing apparatus to produce a machine, such that the instructions which execute on the computer or other programmable data processing apparatus create means for implementing the functions specified in the block or blocks. These computer program instructions may also be stored in a computer-readable memory that can direct a computer or other programmable data processing apparatus to function in a particular manner, such that the instructions stored in the computer-readable memory produce an article of manufacture including instruction means which implement the function specified in the block or blocks. The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions specified in the block or blocks.

Those skilled in the art should also readily appreciate that programs defining the functions of the present invention can be delivered to a computer in many forms; including, but not limited to: (a) information permanently stored on non-writable storage media (e.g. read only memory devices within a computer such as ROM or CD-ROM disks readable by a computer I/O attachment); or (b) information alterably stored on writable storage media (e.g. floppy disks and hard drives).

While the invention is described through the above exemplary embodiments, it will be understood by those of ordinary skill in the art that modification to and variation of the illustrated embodiments may be made without departing from the inventive concepts herein disclosed.

What is claimed is:

1. A computer-implemented method, comprising executing, on at least one processor, the steps of:
    storing an encrypted content item on behalf of a first user;
    storing an identifier enabling identification of an encryption key used to encrypt the content item;
    storing a list comprising one or more other users trusted to access the encrypted content item;
    notifying a second user that the second user is trusted to access the encrypted content item;
    receiving an authentication request comprising information identifying the second user;
    in response to receiving the authentication request, performing an authentication operation in connection with the authentication request by authenticating the information identifying the second user;
    upon successful authentication of the second user, issuing an access token to the second user that grants access to the content item encrypted by the first user;
    receiving the access token from the second user;
    in response to receiving the access token, validating the access token to confirm that the second user has access to the content item encrypted by the first user;
    providing, by a content management server and to the second user, the encrypted content item and the identifier enabling identification of the encryption key used to encrypt the content item;
    receiving, from the second user, a request requesting a decryption key suitable for decrypting the encrypted content item, the request comprising the identifier enabling identification of the encryption key used to encrypt the content item;
    in response to receiving the request, utilizing the identifier to obtain the decryption key for decrypting the encrypted content item; and
    providing, by a key management server and to the second user, the decryption key for enabling the second user to decrypt the encrypted content item;
    wherein the content management server is separate to the key management server; and
    further wherein the second user will not be provided with all of the encrypted content item, the identifier and the decryption key by the content management server and the key management server until the access token is validated.

2. A computer program product having a non-transitory computer readable medium which stores a set of instructions, the set of instructions, when carried out by computerized processing circuitry, causing the computerized processing circuitry to perform a method of:
    storing an encrypted content item on behalf of a first user;
    storing an identifier enabling identification of an encryption key used to encrypt the content item;
    storing a list comprising one or more other users trusted to access the encrypted content item;
    notifying a second user that the second user is trusted to access the encrypted content item;
    receiving an authentication request comprising information identifying the second user;
    in response to receiving the authentication request, performing an authentication operation in connection with the authentication request by authenticating the information identifying the second user;
    upon successful authentication of the second user, issuing an access token to the second user that grants access to the content item encrypted by the first user;
    receiving the access token from the second user;
    in response to receiving the access token, validating the access token to confirm that the second user has access to the content item encrypted by the first user;
    providing, by a content management server and to the second user, the encrypted content item and the identifier enabling identification of the encryption key used to encrypt the content item;
    receiving, from the second user, a request requesting a decryption key suitable for decrypting the encrypted content item, the request comprising the identifier enabling identification of the encryption key used to encrypt the content item;
    in response to receiving the request, utilizing the identifier to obtain the decryption key for decrypting the encrypted content item; and
    providing, by a key management server and to the second user, the decryption key for enabling the second user to decrypt the encrypted content item;
    wherein the content management server is separate to the key management server; and
    further wherein the second user will not be provided with all of the encrypted content item, the identifier and the decryption key by the content management server and the key management server until the access token is validated.

3. A device, comprising:
    memory; and
    processing circuitry coupled to the memory, the memory storing program code which, when executed by the processing circuitry, cause the processing circuitry to:
    store an encrypted content item on behalf of a first user;
    store an identifier enabling identification of an encryption key used to encrypt the content item;
    store a list comprising one or more other users trusted to access the encrypted content item;
    notify a second user that the second user is trusted to access the encrypted content item;
    receive an authentication request comprising information identifying the second user;
    in response to receiving the authentication request, perform an authentication operation in connection with the authentication request by authenticating the information identifying the second user;
    upon successful authentication of the second user, issue an access token to the second user that grants access to the content item encrypted by the first user;
    receive the access token from the second user;

in response to receiving the access token, validate the access token to confirm that the second user has access to the content item encrypted by the first user;

provide, by a content management server and to the second user, the encrypted content item and the identifier enabling identification of the encryption key used to encrypt the content item;

receive, from the second user, a request requesting a decryption key suitable for decrypting the encrypted content item, the request comprising the identifier enabling identification of the encryption key used to encrypt the content item;

in response to receiving the request, utilize the identifier to obtain the decryption key for decrypting the encrypted content item; and provide, by a key management server and to the second user, the decryption key for enabling the second user to decrypt the encrypted content item;

wherein the content management server is separate to the key management server; and further wherein the second user will not be provided with all of the encrypted content item, the identifier and the decryption key by the content management server and the key management server until the access token is validated.

* * * * *